(12) United States Patent
Morota et al.

(10) Patent No.: US 7,890,619 B2
(45) Date of Patent: Feb. 15, 2011

(54) SERVER APPARATUS, AND INFORMATION PROCESSING METHOD FOR NOTIFYING OF DETECTION OF COMPUTER VIRUS

(75) Inventors: Satoru Morota, Yokohama (JP); Yasutaka Urakawa, Yokohama (JP); Tatsuya Kato, Yokohama (JP); Kenji Ishii, Yokohama (JP); Masanori Fujita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1217 days.

(21) Appl. No.: 10/375,351

(22) Filed: Feb. 28, 2003

(65) Prior Publication Data

US 2003/0200460 A1  Oct. 23, 2003

(30) Foreign Application Priority Data

Feb. 28, 2002 (JP) ............................ P2002-054249
Feb. 19, 2003 (JP) ............................ P2003-041516

(51) Int. Cl.
*G06F 15/176* (2006.01)

(52) U.S. Cl. .................. 709/224; 709/232; 709/229; 713/182; 713/188; 713/200; 726/12; 726/24

(58) Field of Classification Search ................ 709/224, 709/229, 232; 713/182, 200, 188; 726/12, 726/24

See application file for complete search history.

(56) References Cited

U.S. PATENT DOCUMENTS 6,725,377 B1 * 4/2004 Kouznetsov ................. 726/23
6,785,732 B1 * 8/2004 Bates et al. .................. 709/232
6,892,303 B2 * 5/2005 Le Pennec et al. .......... 713/188
7,010,696 B1 * 3/2006 Cambridge et al. ......... 713/188
7,272,724 B2 * 9/2007 Tarbotton et al. ........... 713/188
2002/0116639 A1 * 8/2002 Chefalas et al. ............. 713/201
2002/0129264 A1 * 9/2002 Rowland et al. ............ 713/200
2002/0157020 A1 * 10/2002 Royer ........................ 713/201
2002/0178381 A1 * 11/2002 Lee et al. .................... 713/201
2002/0194489 A1 * 12/2002 Almogy et al. ............. 713/200
2003/0033331 A1 * 2/2003 Sena et al. .................. 707/513

FOREIGN PATENT DOCUMENTS

WO  WO 01/33889  5/2001

OTHER PUBLICATIONS

Internet Citation, URL:http://www.europe.f-secure.com/news/20, pp. 1-2, XP-002220984, "F-Secure Announces World's First Anti-Virus Product for Wireless Information Devices", Aug. 15, 2000.

* cited by examiner

*Primary Examiner*—Thuong T Nguyen
(74) *Attorney, Agent, or Firm*—Oblon, Spivak, McClelland, Maier & Neustadt, L.L.P.

(57) ABSTRACT

A mail transmitting server includes a notification method table, a data receiver, and a notification method selector. The notification method table stores types of computer viruses and notification methods for the result of detection of computer viruses in association with each other. The data receiver receives data from a cellular phone. The notification method selector selects a method of notifying the cellular phone of the virus detection result, based on a type of a computer virus included in the data received by the data receiver.

18 Claims, 9 Drawing Sheets

| TYPE OF COMPUTER VIRUS | NOTIFICATION METHOD |
|---|---|
| COMPUTER VIRUS A | E-MAIL |
| COMPUTER VIRUS B | AUDIO RESPONSE BY TELEPHONE |
| COMPUTER VIRUS C | E-MAIL OR AUDIO RESPONSE |

102a

SERVER APPARATUS, AND INFORMATION PROCESSING METHOD FOR NOTIFYING OF DETECTION OF COMPUTER VIRUS

BACKGROUND OF THE INVENTION

1. Field of the Invention

The present invention relates to a server apparatus, and an information processing method.

2. Related Background Art

Recent development is outstanding in the information communication technology and our daily lives nowadays in information society are becoming increasingly convenient. For example, the spread of the Internet facilitated download and utilization of useful application programs and data files (hereinafter simply referred to as "data") in communication terminal equipment such as personal computers and the like.

However, information downloaded through the Internet into the communication terminal equipment is not always only useful data. Computer viruses to destroy the useful data often invade the terminal equipment through the Internet.

For example, the computer virus detection technology of the pattern matching method is known as a technique of detecting whether a computer virus invaded data downloaded in the terminal equipment or data uploaded from the terminal equipment. In this technology, a server apparatus stores a database storing characteristic data strings included in computer viruses (hereinafter referred to as pattern data) and compares received data with the pattern data. When the result of the comparison is that the data includes the pattern data, it is determined that the data includes a computer virus.

SUMMARY OF THE INVENTION

However, the conventional technology had the following problem. Namely, when it is determined that the data includes a computer virus, the communication terminal performs a process of notifying the user of the communication terminal of the fact (a warning process). This notification method was determined without consideration to the type of the computer virus detected or the type of service available to the communication terminal and was not always useful to the user of the communication terminal.

The present invention has been accomplished to solve the above problem and an object of the present invention is thus to provide a server apparatus, and an information processing method with improved convenience in the notification of the detection result of computer viruses.

In order to solve the above problem, a server apparatus according to the present invention is a server apparatus comprising: storage means for storing types of computer viruses, and notification methods for the result of detection of computer viruses in association with each other; receiving means for receiving data (including application programs and data files) from a communication terminal; and selecting means for selecting a notification method for the result of detection of computer viruses to the communication terminal, corresponding to a type of a computer virus included in the data received by the receiving means, on the basis of the types of the computer viruses and the notification methods stored in the storage means.

In the same way, in order to solve the above problem, an information processing method according to the present invention is an information processing method of processing data from a communication terminal, received by a server apparatus, the information processing method comprising: a storing step wherein the server apparatus stores types of computer viruses and notification methods for the result of detection of computer viruses in association with each other in storage means; a transmitting step wherein the communication terminal transmits data to the server apparatus; a receiving step wherein the server apparatus receives the data transmitted from the communication terminal in the transmitting step; and a selecting step wherein the server apparatus selects a notification method for the result of detection of computer viruses to the communication terminal, corresponding to a type of a computer virus included in the data received in the receiving step, on the basis of the types of the computer viruses and the notification methods stored in the storing step.

Furthermore, an information processing system, which has the server apparatus according to the present invention, can be constructed. This information processing system comprises the above-stated server apparatus, and a communication terminal provided with transmitting means for transmitting data to the server apparatus, and is configured to implement communication between the server apparatus and the communication terminal.

According to these aspects of the invention, a notification method for the detection result to the communication terminal, corresponding to the type of the computer virus included in the data received from the communication terminal, is selected on the basis of the types of the computer viruses and the notification methods stored in the storage means. Such selection of the notification method is particularly effective, for example, in the case where it is difficult to provide the notification of the detection result by e-mail because of infection with a computer virus that obstructs or abuses transmission and reception of e-mail, tightness of traffic, and so on. In such cases, if the detection result is notified of by an audio response of telephone, the user of the communication terminal can be notified securely and quickly of the detection result of computer viruses. As a consequence, convenience can be enhanced in the notification of the detection result of computer viruses.

In the server apparatus according to the present invention, the storage means stores types of services available to the communication terminal and notification methods for the result of detection of computer viruses in association with each other, and the selecting means selects a notification method for the result of detection of computer viruses to the communication terminal on the basis of the types of the services and the notification methods stored in the storage means.

In the same way, in the above-stated information processing method, in the storing step the server apparatus stores types of services available to the communication terminal, and notification methods for the result of detection of computer viruses in association with each other in the storage means, and in the selecting step the server apparatus selects the notification method for the result of detection of computer viruses to the communication terminal on the basis of the types of the services and the notification methods stored in the storage means.

According to these aspects of the invention, the notification method for the detection result to the communication terminal is selected based on the types of the services and the notification methods stored in the storage means. For example, when an audio response service by telephone is available to the communication terminal, the detection result of computer viruses is notified of by the audio response of telephone. Conversely, when the audio response service by telephone is not available to the communication terminal, the detection result of computer viruses is notified of by e-mail. This permits the user of the communication terminal to be notified more securely and quickly of the detection result of computer viruses. As a consequence, the convenience can be more improved in the notification of the detection result of computer viruses. The selection of the notification method based on the types of services is particularly effective in the case where the present invention is applied to mobile communication terminals such as cellular phones to which many types of services are provided and among which types of available services are different depending upon models and OS's.

More preferably, the server apparatus according to the present invention further comprises restricting means for restricting services available to the communication terminal, based on a type of a computer virus included in the data received by the receiving means.

In the same way, more preferably, the above-stated information processing method further comprises a restricting step wherein the server apparatus restricts services available to the communication terminal, based on a type of a computer virus included in the data received in the receiving step.

According to these aspects of the invention, the services available to the communication terminal are restricted based on the type of the computer virus detected in the data transmitted from the communication terminal to the server apparatus. For example, an example of the restrictions is such a temporary limitation (including a stop) that the server apparatus temporarily limits the service of permitting the communication terminal to send e-mail, whereby it is feasible to prevent abuse of the e-mail transmission function by a computer virus or infection of other communication terminals with a computer virus.

More preferably, the server apparatus according to the present invention further comprises charge nullifying means for nullifying a communication charge of data between the communication terminal and the server apparatus if the data received by the receiving means includes a computer virus.

In the same way, more preferably, the above-stated information processing method further comprises a charge nullifying step wherein the server apparatus nullifies a communication charge of data between the communication terminal and the server apparatus if the data received in the receiving step includes a computer virus.

According to these aspects of the invention, if the data transmitted from the communication terminal to the server apparatus includes a computer virus, the data transmitted from the communication terminal to the server apparatus is made free of communication charge. This prevents a communication charge (including a packet fee) from being charged even for the data not delivered to a desired destination as a result of detection of a computer virus. Accordingly, the user of the communication terminal can avoid waste of communication cost.

Another server apparatus according to the present invention is a server apparatus comprising: storage means for storing types of computer viruses and notification methods for the result of detection of computer viruses in association with each other; receiving means for receiving data (including application programs and data files) destined for a communication terminal from an information processing apparatus; and selecting means for selecting a notification method for the result of detection of computer viruses to the communication terminal, corresponding to a type of a computer virus included in the data received by the receiving means, on the basis of the types of the computer viruses and the notification methods stored in the storage means.

In the same way, another information processing method according to the present invention is an information processing method of processing data from an information processing apparatus, received by a server apparatus, the information processing method comprising: a storing step wherein the server apparatus stores types of computer viruses, and notification methods for the result of detection of computer viruses in association with each other in storage means; a transmitting step wherein the information processing apparatus transmits data destined for a communication terminal to the server apparatus; a receiving step wherein the server apparatus receives the data transmitted from the information processing apparatus in the transmitting step; and a selecting step wherein the server apparatus selects a notification method for the result of detection of computer viruses to the communication terminal, corresponding to a type of a computer virus included in the data received in the receiving step, on the basis of the types of the computer viruses and the notification methods stored in the storing step.

Furthermore, an information processing system, which has the server apparatus according to the present invention, can be constructed. This information processing system comprises the above-stated server apparatus, and an information processing apparatus provided with transmitting means for transmitting data destined for a communication terminal to the server apparatus, and is configured to implement communication between the server apparatus and the information processing apparatus.

According to these aspects of the invention, the notification method for the detection result to the communication terminal, corresponding to the type of the computer virus included in the data transmitted from the information processing apparatus to the communication terminal is selected on the basis of the types of the computer viruses and the notification methods stored in the storage means. Such selection of the notification method is particularly effective, for example, in the case where it is difficult to provide the notification of the detection result by e-mail because of infection with a computer virus that obstructs or abuses transmission and reception of e-mail, tightness of traffic, and so on. In such cases, if the detection result of computer viruses is notified of by an audio response of telephone, it is feasible to securely and quickly notify the user that the computer virus was present in the data transmitted to the user of the communication terminal. As a consequence, the convenience can be improved in the notification of the detection result of computer viruses.

Another server apparatus according to the present invention is a server apparatus configured to perform communication with a relay server apparatus for transferring data transmitted from a communication terminal to a predetermined destination, the server apparatus comprising: storage means for storing types of computer viruses and notification methods for the result of detection of computer viruses in association with each other; receiving means for receiving data along with a virus detection request from the relay server apparatus; detecting means for detecting a computer virus in the data received by the receiving means; selecting means for selecting a notification method for the result of detection of computer viruses to the communication terminal, corresponding to a type of a computer virus included in the data received by the receiving means, on the basis of the types of the computer viruses and the notification methods stored in the storage means; and requesting means for requesting the relay server apparatus to provide a notification of the detection result by the notification method selected by the selecting means, when the detecting means detects the computer virus in the data.

In the same way, another information processing method according to the present invention is an information processing method in which a server apparatus performs communication with a relay server apparatus for transferring data transmitted from a communication terminal to a predetermined destination, the information processing method comprising: a storing step of storing types of computer viruses and notification methods for the result of detection of computer viruses in association with each other in storage means; a receiving step of receiving data along with a virus detection request from the relay server apparatus; a detecting step of detecting a computer virus in the data received in the receiving step; a selecting step of selecting a notification method for the result of detection of computer viruses to the communication terminal, corresponding to a type of a computer virus included in the data received in the receiving step, on the basis of the types of the computer viruses and the notification methods stored in the storage means; and a requesting step of requesting the relay server apparatus to provide a notification of the detection result by the notification method selected in the selecting step, when a computer virus is detected in the data in the detecting step.

According to these aspects of the invention, the server apparatus, receiving the request from the relay server apparatus, performs the detection process of detecting computer viruses, and the selection process of selecting the notification method for the detection result. Accordingly, the relay server apparatus itself, which directly receives data from the communication terminal and transfers the data, does not have to execute the above detection process and selection process. For this reason, improvement is achieved in the convenience in the notification of the detection result of computer viruses, which is the object of the present invention, without addition of any new function to the existing relay server apparatus and without any change in the existing functions. According to these aspects of the invention, the detection result of computer viruses is sent back to the communication terminal as a source terminal of the data.

The above-mentioned relay server apparatus is concretely the mail server apparatus or a proxy server apparatus and soon. Particularly, in the case that the relay server apparatus is the mail server apparatus, the above-stated server apparatus is a server apparatus configured to perform communication with a mail server apparatus for transferring data transmitted from a communication terminal to a predetermined destination, the server apparatus comprising: storage means for storing types of computer viruses and notification methods for the result of detection of computer viruses in association with each other; receiving means for receiving data along with a virus detection request from the mail server apparatus; detecting means for detecting a computer virus in the data received by the receiving means; selecting means for selecting a notification method for the result of detection of computer viruses to the communication terminal, corresponding to a type of a computer virus included in the data received by the receiving means, on the basis of the types of the computer viruses and the notification methods stored in the storage means; and requesting means for requesting the mail server apparatus to provide a notification of the detection result by the notification method selected by the selecting means, when the detecting means detects the computer virus in the data.

In the same way, the above-stated information processing method is an information processing method in which a server apparatus performs communication with a mail server apparatus for transferring data transmitted from a communication terminal to a predetermined destination, the information processing method comprising: a storing step of storing types of computer viruses and notification methods for the result of detection of computer viruses in association with each other in storage means; a receiving step of receiving data along with a virus detection request from the mail server apparatus; a detecting step of detecting a computer virus in the data received in the receiving step; a selecting step of selecting a notification method for the result of detection of computer viruses to the communication terminal, corresponding to a type of a computer virus included in the data received in the receiving step, on the basis of the types of the computer viruses and the notification methods stored in the storage means; and a requesting step of requesting the mail server apparatus to provide a notification of the detection result by the notification method selected in the selecting step, when a computer virus is detected in the data in the detecting step.

According to these aspects of the invention, the server apparatus, receiving the request from the mail server apparatus, performs the detection process of detecting computer viruses, and the selection process of selecting the notification method for the detection result. Accordingly, the mail server apparatus itself, which directly receives data from the communication terminal and transfers the data, does not have to execute the above detection process and selection process. For this reason, improvement is achieved in the convenience in the notification of the detection result of computer viruses, which is the object of the present invention, without addition of the function of virus detection and a selecting a notification method to the existing mail server apparatus. According to these aspects of the invention, the detection result of computer viruses is sent back to the communication terminal as a source terminal of the data.

In the above-stated server apparatus, preferably, the storage means stores types of services available to the communication terminal and notification methods for the result of detection of computer viruses in association with each other, and the selecting means selects a notification method for the result of detection of computer viruses to the communication terminal on the basis of the types of the services and the notification methods stored in the storage means.

The above-stated server apparatus further comprises restricting means for restricting services available to the communication terminal, based on a type of a computer virus included in the data received by the receiving means.

The above-stated server apparatus further comprises charge nullifying means for nullifying a communication charge of data between the communication terminal and the server apparatus if the data received by the receiving means includes a computer virus.

Still another server apparatus according to the present invention is a server apparatus configured to perform communication with a relay server apparatus for transferring data transmitted from an information processing apparatus to a predetermined destination, the server apparatus comprising: storage means for storing types of computer viruses and notification methods for the result of detection of computer viruses in association with each other; receiving means for receiving data along with a virus detection request from the relay server apparatus; detecting means for detecting a computer virus in the data received by the receiving means; selecting means for selecting a notification method for the result of detection of computer viruses to a communication terminal, corresponding to a type of a computer virus included in the data received by the receiving means, on the basis of the types of the computer viruses and the notification methods stored in the storage means; and requesting means for requesting the relay server apparatus to provide a notification of the detection result by the notification method selected by the selecting means, when the detecting means detects the computer virus in the data.

In the same way, another information processing method according to the present invention is an information processing method in which a server apparatus performs communication with a relay server apparatus for transferring data transmitted from an information processing apparatus to a predetermined destination, the information processing method comprising: a storage step of storing types of computer viruses and notification methods for the result of detection of computer viruses in association with each other in storage means; a receiving step of receiving data along with a virus detection request from the relay server apparatus; a detecting step of detecting a computer virus in the data received in the receiving step; a selecting step of selecting a notification method for the result of detection of computer viruses to a communication terminal, corresponding to a type of a computer virus included in the data received in the receiving step, on the basis of the types of the computer viruses and the notification methods stored in the storage means; and a requesting step of requesting the relay server apparatus to provide a notification of the detection result by the notification method selected in the selecting step, when a computer virus is detected in the data in the detecting step.

According to these aspects of the invention, the server apparatus, receiving the request from the relay server apparatus, performs the detection process of detecting computer viruses, and the selection process of selecting the notification method for the detection result. Accordingly, the relay server apparatus itself, which directly receives data from the information processing apparatus and transfers the data, does not have to execute the above detection process and selection process. For this reason, improvement is achieved in the convenience in the notification of the detection result of computer viruses, which is the object of the present invention, without addition of the function of virus detection and a selecting a notification method to the existing mail server apparatus. According to these aspects of the invention, the detection result of computer viruses is not received by the information processing apparatus as a source of the data, but is received by the communication terminal as a destination of the data.

The above-mentioned relay server apparatus is concretely the mail server apparatus or a proxy server apparatus and so on. Particularly, in the case that the relay server apparatus is the mail server apparatus, the above-stated server apparatus is a server apparatus configured to perform communication with a mail server apparatus for transferring data transmitted from an information processing apparatus to a predetermined destination, the server apparatus comprising: storage means for storing types of computer viruses and notification methods for the result of detection of computer viruses in association with each other; receiving means for receiving data along with a virus detection request from the mail server apparatus; detecting means for detecting a computer virus in the data received by the receiving means; selecting means for selecting a notification method for the result of detection of computer viruses to a communication terminal, corresponding to a type of a computer virus included in the data received by the receiving means, on the basis of the types of the computer viruses and the notification methods stored in the storage means; and requesting means for requesting the mail server apparatus to provide a notification of the detection result by the notification method selected by the selecting means, when the detecting means detects the computer virus in the data.

In the same way, the above-stated information processing method is an information processing method in which a server apparatus performs communication with a mail server apparatus for transferring data transmitted from an information processing apparatus to a predetermined destination, the information processing method comprising: a storage step of storing types of computer viruses and notification methods for the result of detection of computer viruses in association with each other in storage means; a receiving step of receiving data along with a virus detection request from the mail server apparatus; a detecting step of detecting a computer virus in the data received in the receiving step; a selecting step of selecting a notification method for the result of detection of computer viruses to a communication terminal, corresponding to a type of a computer virus included in the data received in the receiving step, on the basis of the types of the computer viruses and the notification methods stored in the storage means; and a requesting step of requesting the mail server apparatus to provide a notification of the detection result by the notification method selected in the selecting step, when a computer virus is detected in the data in the detecting step.

According to these aspects of the invention, the server apparatus, receiving the request from the mail server apparatus, performs the detection process of detecting computer viruses, and the selection process of selecting the notification method for the detection result. Accordingly, the mail server apparatus itself, which directly receives data from the information processing apparatus and transfers the data, does not have to execute the above detection process and selection process. For this reason, improvement is achieved in the convenience in the notification of the detection result of computer viruses, which is the object of the present invention, without addition of the function of virus detection and a selecting a notification method to the existing mail server apparatus. According to these aspects of the invention, the detection result of computer viruses is not received by the information processing apparatus as a source of the data, but is received by the communication terminal as a destination of the data.

In the above-stated server apparatus or information processing method, if computer viruses are detected in the data, the detection result of computer viruses is notified at the server apparatus's request by the relay server apparatus. But, of course, the server apparatus itself also can notify the detection result of computer viruses.

Namely, another server apparatus according to the present invention is a server apparatus configured to perform communication with a mail server apparatus for transferring data transmitted from a communication terminal to a predetermined destination, the server apparatus comprising:

storage means for storing types of computer viruses and notification methods for the result of detection of computer viruses in association with each other; receiving means for receiving data along with a virus detection request from the mail server apparatus; detecting means for detecting a computer virus in the data received by the receiving means; selecting means for selecting a notification method for the result of detection of computer viruses to the communication terminal, corresponding to a type of a computer virus included in the data received by the receiving means, on the basis of the types of the computer viruses and the notification methods stored in the storage means; and notifying means for notifying the detection result by the notification method selected by said selecting means, when said detecting means detects the computer virus in the data.

Still another server apparatus according to the present invention is a server apparatus configured to perform communication with a mail server apparatus for transferring data transmitted from an information processing apparatus to a predetermined destination, the server apparatus comprising:

storage means for storing types of computer viruses and notification methods for the result of detection of computer viruses in association with each other;

receiving means for receiving data along with a virus detection request from the mail server apparatus;

detecting means for detecting a computer virus in the data received by the receiving means; selecting means for selecting a notification method for the result of detection of computer viruses to a communication terminal, corresponding to a type of a computer virus included in the data received by the receiving means, on the basis of the types of the computer viruses and the notification methods stored in the storage means; and notifying means for notifying the detection result by the notification method selected by said selecting means, when said detecting means detects the computer virus in the data.

In the same way, another information processing method according to the present invention is an information processing method in which a server apparatus performs communication with a mail server apparatus for transferring data transmitted from a communication terminal to a predetermined destination, the information processing method comprising: a storing step of storing types of computer viruses and notification methods for the result of detection of computer viruses in association with each other in storage means; a receiving step of receiving data along with a virus detection request from the mail server apparatus; a detecting step of detecting a computer virus in the data received in the receiving step; a selecting step of selecting a notification method for the result of detection of computer viruses to the communication terminal, corresponding to a type of a computer virus included in the data received in the receiving step, on the basis of the types of the computer viruses and the notification methods stored in the storage means; and a notifying step of notifying the detection result by the notification method selected in the selecting step, when a computer virus is detected in the data in the detecting step.

Still another information processing method according to the present invention is an information processing method in which a server apparatus performs communication with a mail server apparatus for transferring data transmitted from an information processing apparatus to a predetermined destination, the information processing method comprising:

a storage step of storing types of computer viruses and notification methods for the result of detection of computer viruses in association with each other in storage means; a receiving step of receiving data along with a virus detection request from the mail server apparatus;

a detecting step of detecting a computer virus in the data received in the receiving step; a selecting step of selecting a notification method for the result of detection of computer viruses to a communication terminal, corresponding to a type of a computer virus included in the data received in the receiving step, on the basis of the types of the computer viruses and the notification methods stored in the storage means; and a notifying step of notifying the detection result by the notification method selected in the selecting step, when a computer virus is detected in the data in the detecting step.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

An information processing system according to the present invention will be described below. The information processing system in the present embodiment comprises a server apparatus according to the present invention and a communication terminal.

Figure 1:
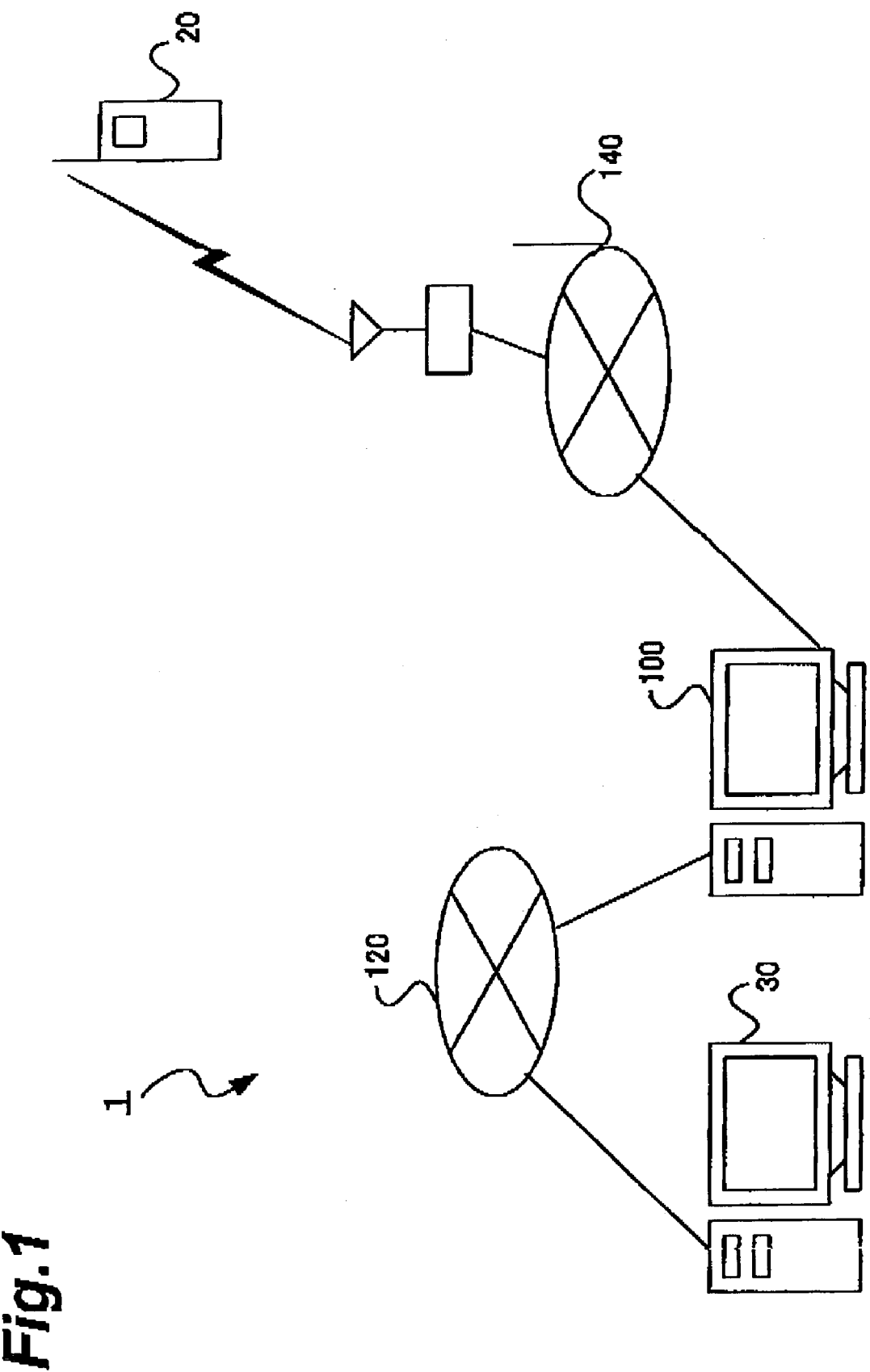
FIG. 1 is a hardware configuration diagram of an information processing system.

First, a configuration of the information processing system in the present embodiment will be described. FIG. 1 is a hardware configuration diagram of the information processing system in the present embodiment. The information processing system 1 in the present embodiment comprises a mail transmitting server 100 (server apparatus), a cellular phone 20 (communication terminal), and a mail receiving server 30.

The mail transmitting server 100 is connected through mobile communication network 140 to the cellular phone 20, and they are able to perform data communication with each other. The mail transmitting server 100 is connected through information communication network 120 to the mail receiving server 30, and they are able to perform data communication with each other.

Figure 2:
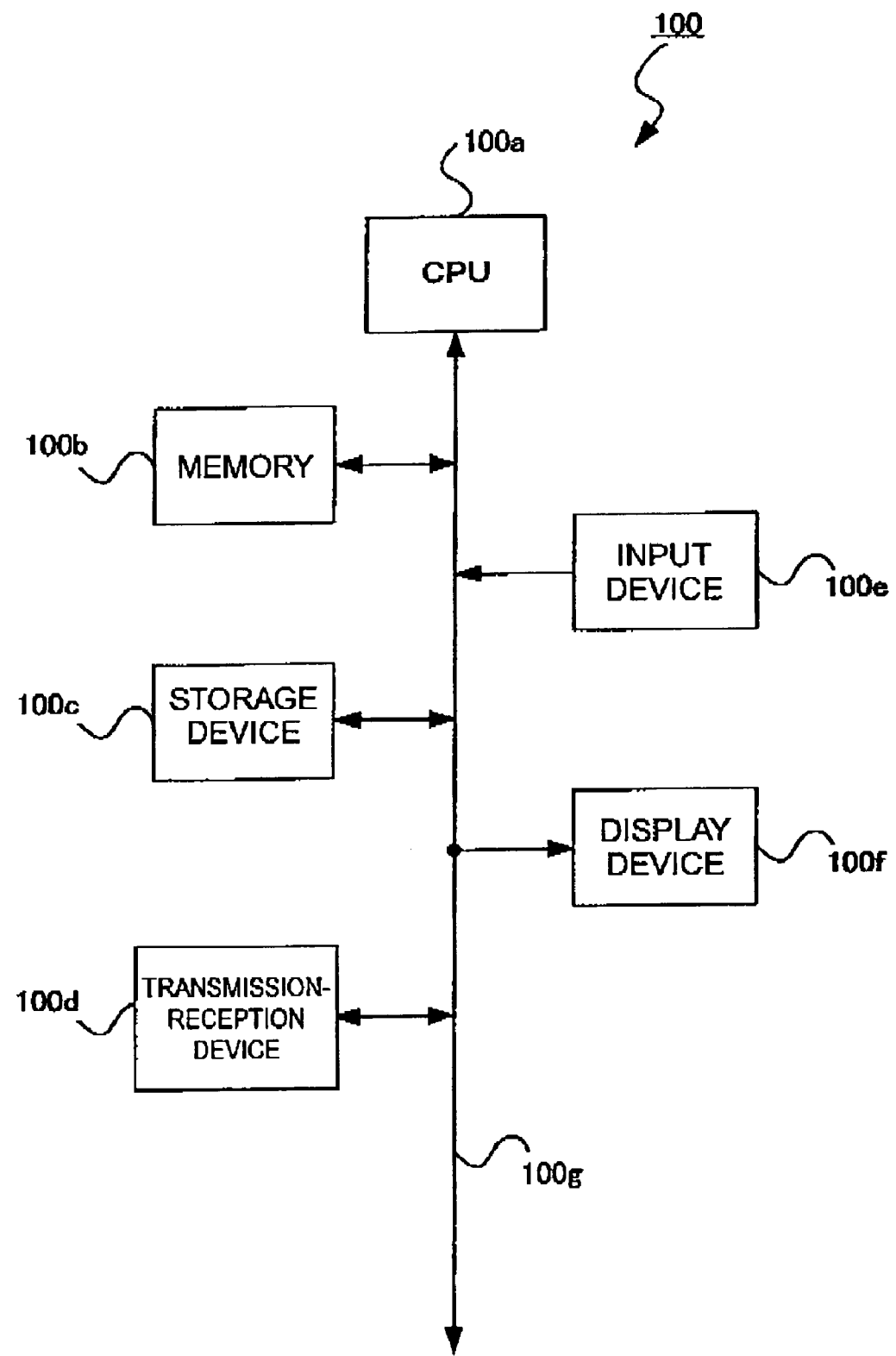
FIG. 2 is a hardware configuration diagram of a mail transmitting server.

A configuration of the mail transmitting server 100 in the present embodiment will be described below. FIG. 2 is a hardware configuration diagram of the mail transmitting server 100. The mail transmitting server 100 comprises a CPU 100a, a memory 100b, a storage device 100c such as a magnetic disk, an optical disk, or the like, a transmission-reception device 100d configured to perform transmission and reception of data with the cellular phone 20 and with the mail receiving server 30, an input device 100e such as a keyboard, a mouse, or the like, and a display device 100f such as a display unit. The CPU 100*a*, memory 100*b*, storage device 100*c*, transmission-reception device 100*d*, input device 100*e*, and display device 100*f* each are connected through bus 100*g* so as to be able to transmit and receive data to and from each other.

Figure 3:
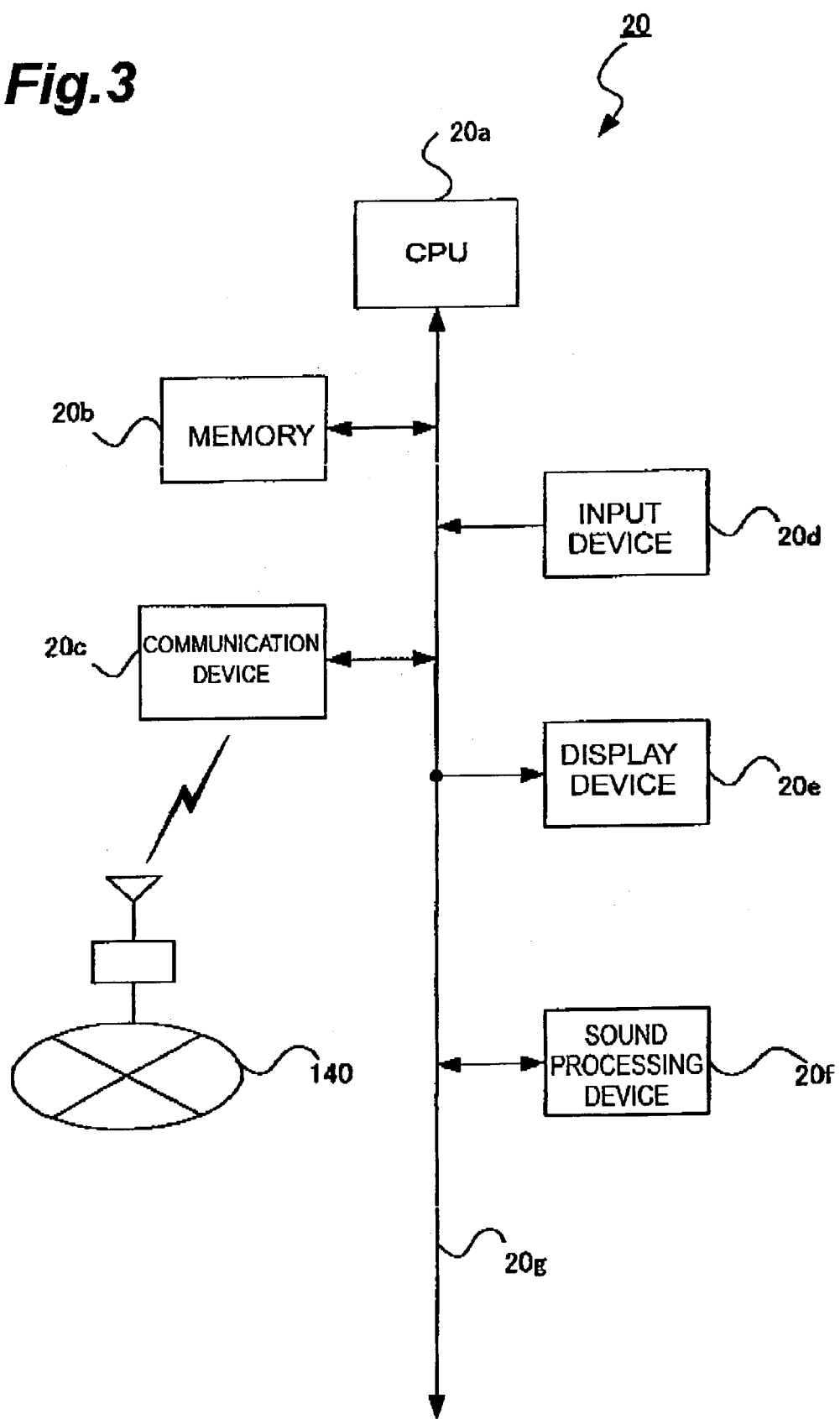
FIG. 3 is a hardware configuration diagram of a cellular phone.

A configuration of the cellular phone 20 in the present embodiment will be described. FIG. 3 is a hardware configuration diagram of the cellular phone 20. The cellular phone 20 comprises a CPU 20*a*, a memory 20*b* such as a semiconductor memory, a communication device 20*c* configured to transmit and receive data to and from the mail transmitting server 100, an input device 20*d* such as operation buttons or the like, a display device 20*e* such as LCD (Liquid Crystal Display), EL (Electro Luminescence), or the like, and a sound processing device 20*f* such as a microphone, a speaker, or the like. The CPU 20*a*, memory 20*b*, communication device 20*c*, input device 20*d*, display device 20*e*, and sound processing device 20*f* each are connected through bus 20*g*, and they are able to transmit and receive data to and from each other.

The hardware configuration of the mail receiving server 30 in the present embodiment is much the same as that of the mail transmitting server 100. Namely, the mail receiving server 30 comprises a CPU, a memory, a storage device, a transmission-reception device, an input device, and a display device.

Figure 4:
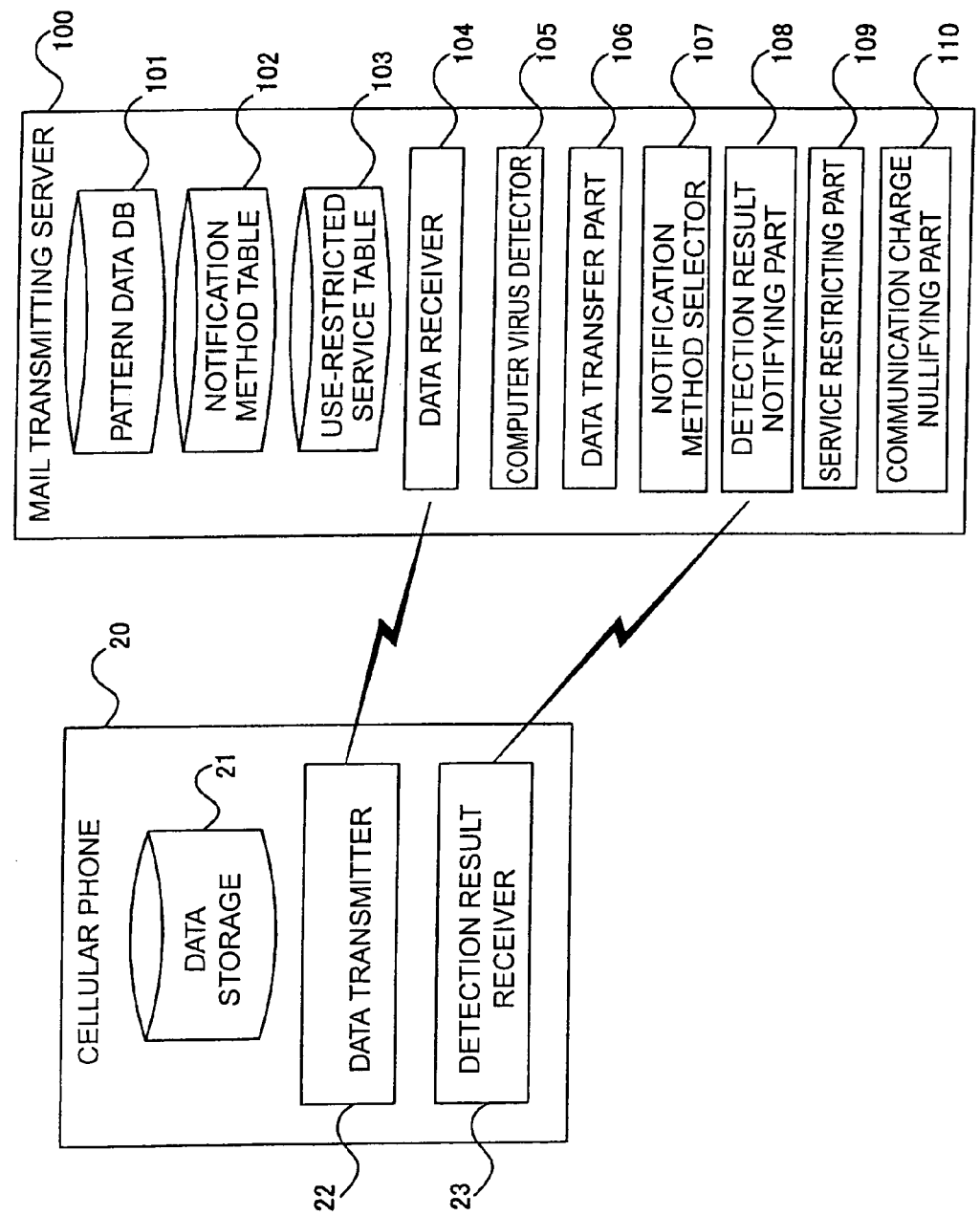
FIG. 4 is a configuration diagram of an information processing system comprised of a mail transmitting server and a cellular phone.

FIG. 4 is a system configuration diagram of the mail transmitting server 100 and cellular phone 20. The mail transmitting server 100 is a server apparatus having a function of detecting computer viruses, and functionally comprises a pattern data database 101, a notification method table 102 (storage means), a use-restricted service table 103, a data receiver 104 (receiving means), a computer virus detector 105, a data transfer part 106, a notification method selector 107 (selecting means), a detection result notifying part 108, a service restricting part 109 (restricting means), and a communication charge nullifying part 110 (charge nullifying means). Here the pattern data database 101, the notification method table 102, and the use-restricted service table 103 correspond to the memory 100*b* shown in FIG. 2. The data receiver 104, computer virus detector 105, data transfer part 106, notification method selector 107, detection result notifying part 108, service restricting part 109, and communication charge nullifying part 110 are implemented when the CPU 100*a* executes software stored in the memory 100*b* shown in FIG. 2.

The cellular phone 20 is a communication terminal configured to transmit and receive data to and from the server apparatus, and functionally comprises a data storage 21, a data transmitter 22 (transmitting means), and a detection result receiver 23. Here the data storage 21 corresponds to the memory 20*b* shown in FIG. 3. The data transmitter 22 and detection result receiver 23 are implemented when the CPU 20*a* executes software stored in the memory 20*b* shown in FIG. 3.

Each of the components of the mail transmitting server 100 will be described below in detail. The pattern data database 101 stores pattern data being characteristic data strings included in computer viruses (which is also called "pattern files" in the file form). Although it was described for convenience sake of description that the pattern data itself was stored in the pattern data database 101, it is also possible to employ a configuration wherein the pattern data database 101 stores pointers indicating storage locations of the pattern data and the pattern data itself is stored in the storage locations indicated by the pointers.

Figure 5A:
FIG. 5A is a configuration diagram of a notification method table based on types of computer viruses.

The notification method table 102 stores notification methods for the detection result of computer viruses and types of computer viruses in association with each other. FIG. 5A is a diagram showing a data storage example 102*a* of the notification method table 102. As shown in FIG. 5A, the notification method table 102 stores data indicating the notification methods for the detection result of computer viruses (e.g., "e-mail," "audio response by telephone," . . . ), in association with the types of computer viruses (e.g., "computer virus A," "computer virus B," . . . ).

Figure 5B:
FIG. 5B is a configuration diagram of a notification method table based on types of services.

The notification methods for the detection result of computer viruses may be stored in association with types of services available to the cellular phone 20. FIG. 5B is a diagram showing a data storage example 102*b* of the notification method table 102. As shown in FIG. 5B, the notification method table 102 stores data indicating the notification methods for the detection result of computer viruses (e.g., "e-mail," "audio response by telephone,") in association with data indicating types of services available to the cellular phone 20 (e.g., "service A," "service B," . . . ). Furthermore, a modification of the notification method table 102 in the present embodiment may be arranged so that the notification methods for the detection result of computer viruses are stored in association with both the types of computer viruses and the types of services available to the cellular phone 20.

Figure 5C:
FIG. 5C is a configuration diagram of a use-restricted service table.

Returning to FIG. 4, the use-restricted service table 103 stores types of services use of which should be restricted, and types of computer viruses in association with each other. FIG. 5C is a diagram showing a data storage example of the use-restricted service table 103. As shown in FIG. 5C, the use-restricted service table 103 stores data about the types of use-restricted services (e.g., "transmission of e-mail," "origination of outgoing call," and "reception of e-mail") in association with the types of computer viruses (e.g., "computer virus A," "computer virus B," and "computer virus C").

Returning again to FIG. 4, the data receiver 104 receives data along with a data processing request transmitted from the data transmitter 22 of the cellular phone 20. In the present embodiment, since the destination of the data from the cellular phone 20 is the mail transmitting server 100, a mail transmission request corresponds to the data processing request.

The computer virus detector 105 detects whether the data received by the data receiver 104 includes a computer virus, using the pattern data stored in the pattern data database 101 (to perform virus scan). More specifically, the computer virus detector 105 compares the data received by the data receiver 104, with the pattern data stored in the pattern data database 101, and determines whether the data includes a portion matching the pattern data. If the data includes a portion matching the pattern data, the computer virus detector 105 determines that the data includes a computer virus; if the data includes no portion matching the pattern data, the computer virus detector 105 determines that the data includes no computer virus.

The data transfer part 106 transmits the data to the mail receiving server 30 when the data received by the data receiver 104 includes no computer virus. The data transmitted to the mail receiving server 30 is sent to a communication terminal designated as a destination by the user of the cellular phone 20.

When the data received by the data receiver 104 includes a computer virus, the notification method selector 107 identifies the type of the computer virus and refers to the data stored in the notification method table 102 to select a notification method for the detection result corresponding to the type of the computer virus. For example, when the computer virus detected is "computer virus A," "e-mail" is selected as a notification method for the detection result; when the computer virus detected is "computer virus B," "audio response by telephone" is selected as a notification method for the detection result.

The detection result notifying part 108 notifies the cellular phone 20 of the detection result of computer viruses, using the notification method selected by the notification method selector 107. For example, when the notification method selected is "e-mail," an e-mail to notify the user of the detection result of computer viruses is sent to the cellular phone 20; when the notification method selected is "audio response by telephone," a voice message to notify the user of the detection result of computer viruses is sent out to the cellular phone 20.

When the data received by the data receiver 104 includes a computer virus, the service restricting part 109 refers to the data stored in the use-restricted service table 103 and poses restrictions on the services available to the cellular phone 20. For example, when the computer virus detected is "computer virus A," the transmission service of e-mail from the cellular phone 20 is restricted (including a stop). Such restriction on the transmission of e-mail is particularly suitable for the case where it is anticipated that the user of the cellular phone 20 may abuse the mail transmitting function. When the computer virus detected is "computer virus B," the service of origination of outgoing call from the cellular phone 20 is restricted (including a stop). Such restriction on the origination of outgoing call is particularly suitable for the case where it is anticipated that the user of the cellular phone 20 may abuse the telephone function. Furthermore, when the computer virus detected is "computer virus C," the receiving service of e-mail by the cellular phone 20 is restricted (including a stop). Such restriction on the reception of e-mail is particularly suitable for the case where the contents data stored in the cellular phone 20 can be destroyed by the data received by the cellular phone 20. Each service restriction may be effected on a specific mail address or telephone number, or on all mail addresses or telephone numbers.

When the data received by the data receiver 104 includes a computer virus, the communication charge nullifying part 110 nullifies (or waives) the communication charge of the data transmitted from the cellular phone 20 to the mail transmitting server 100.

Each of the components of the cellular phone 20 will be described below in detail. The data storage 21 stores data (including application programs and data files) as targets for transmission by e-mail. The data transmitter 22 transmits data stored in the data storage 21, along with a mail transmission request to the mail transmitting server 100. The detection result receiver 23 receives the detection result transmitted from the detection result notifying part 108 of the mail transmitting server 100.

Figure 6:
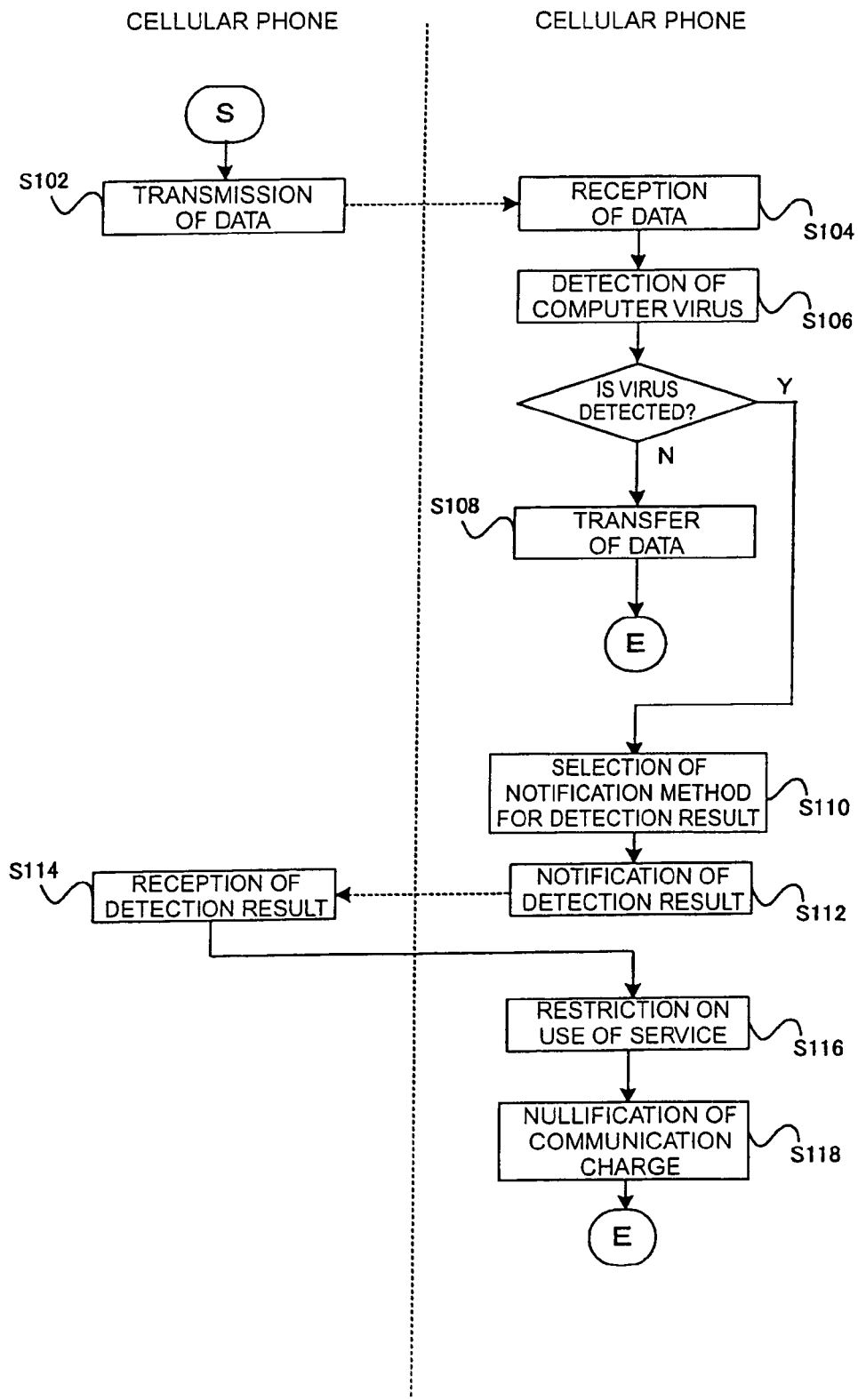
FIG. 6 is a flowchart showing the flow of processing of the mail transmitting server and the cellular phone.

The following will describe the operation of the information processing system in the present embodiment and also describe an information processing method in an embodiment of the present invention. FIG. 6 is a flowchart showing the operation of the information processing system 1 in the present embodiment. In the information processing system 1 in the present embodiment, first, the data transmitter 22 transmits data retrieved from the data storage 21, along with a mail transmission request from the cellular phone 20 to the mail transmitting server 100 (S102). The data and mail transmission request transmitted from the cellular phone 20 are received by the data receiver 104 of the mail transmitting server 100 (S104).

When the data receiver 104 of the mail transmitting server 100 receives the data and mail transmission request, the computer virus detector 105 starts the detection of computer virus (S106). Namely, the computer virus detector 105 compares the data received by the data receiver 104, with the pattern data stored in the pattern data database 101, and determines whether the data received includes a portion matching the pattern data.

When the result of the detection is that the data received by the data receiver 104 includes no portion matching the pattern data, it is determined that the data includes no computer virus, and the data transfer part 106 transfers the data to the mail receiving server 30 (S108). Thereafter, the data transmitted to the mail receiving server 30 is transmitted to a communication terminal designated as a destination by the user of the cellular phone 20.

On the other hand, if the data received by the data receiver 104 includes a portion matching the pattern data, it is determined that the data includes a computer virus, and the notification method selector 104 selects a notification method for the detection result of computer virus (S110).

Then the detection result notifying part 108 transmits the virus detection result by the computer virus detector 105 to the cellular phone 20 (S112). The detection result is information indicating whether the data received by the data receiver 104 includes a computer virus. The detection result thus transmitted is received by the detection result receiver 23 of the cellular phone 20 (S114). The notification method for the detection result can also be to make use of the audio response by telephone, in addition to e-mail. For the notification by the audio response, the mail transmitting server 100 may send a voice message to notify that the data includes a computer virus, to the cellular phone 20, or may request the user of the cellular phone 20 to make a call to an audio response server configured to provide audio guidance.

When the detection result receiver 23 of the cellular phone 20 receives the detection result, the service restricting part 109 restricts the services available to the cellular phone 20 (S116). The restriction on the use of the services by the service restricting part 109 is effected by reference to the data stored in the use-restricted service table 103. Namely, when the type of the computer virus detected is "computer virus A," the use of the service for the cellular phone 20 to transmit e-mail is restricted. When the type of the computer virus detected is "computer virus B," the use of the service for the cellular phone 20 to originate an outgoing call is restricted. Furthermore, when the type of the computer virus detected is "computer virus C," the use of the service for the cellular phone 20 to receive e-mail is restricted.

Then the communication charge nullifying part 110 nullifies the communication charge of the data transmitted from the cellular phone 20 to the mail transmitting server 100 (S118). The communication charge of data is a packet communication fee in the case where the packet communication network is used for communication of data, or a connection fee in the case where the circuit switching network is used for communication of data.

The following will describe the action and effect of the information processing system in the present embodiment. According to the information processing system 1 in the present embodiment, the mail transmitting server 100 selects a notification method for the detection result to the cellular phone 20, based on the type of the computer virus detected in the data transmitted from the cellular phone 20 to the mail transmitting server 100. Such selection of the notification method is particularly effective, for example, in the case where it is difficult to provide the notification of the detection result by e-mail because of infection with a computer virus that obstructs (including destruction) or abuses transmission and reception of e-mail, tightness of traffic, and so on. In such cases, the notification of the detection result by the audio response of telephone makes it feasible to securely and quickly notify the user of the cellular phone 20 of the virus detection result.

The mail transmitting server 100 may be configured to select the notification method for the detection result to the cellular phone 20, based on the type of the service available to the cellular phone 20. Namely, when the audio response service by telephone is available to the cellular phone 20, the virus detection result is notified of by the audio response of telephone. Conversely, when the audio response service by telephone is not available to the cellular phone 20, the user of the cellular phone 20 is notified of the virus detection result by e-mail. This makes it feasible to securely and quickly notify the user of the cellular phone 20 of the virus detection result.

Furthermore, according to the information processing system 1 in the present embodiment, the mail transmitting server 100 restricts the services available to the cellular phone 20, based on the type of the computer virus detected in the data transmitted from the cellular phone 20 to the mail transmitting server 100. For example, an example of the restriction is such that the mail transmitting server 100 temporarily restricts the service of transmitting e-mail from the cellular phone 20 (including a stop), whereby it is feasible to prevent the abuse of the e-mail transmitting function by the computer virus or infection of other cellular phones with the computer virus.

According to the information processing system 1 in the present embodiment, the mail transmitting server 100 nullifies the communication charge for the data transmitted from the cellular phone 20 to the mail transmitting server 100, when the data transmitted from the cellular phone 20 to the mail transmitting server 100 includes a computer virus. This can avoid billing of the communication charge even on the data not delivered to a desired destination because of the result of the detection of the computer virus. Accordingly, the user of the cellular phone 20 is allowed to avoid waste of communication cost.

It is noted herein that the form described in the present embodiment is just a preferred example of the information processing system according to the present invention and that the present invention is by no means intended to be limited to the above form. For example, the present embodiment was configured so that the data receiver 104 of the mail transmitting server 100 received the data transmitted from the data transmitter 22 of the cellular phone 20, whereas it is also possible to employ another system configuration shown in FIG. 7. Namely, the information processing system further comprises a personal computer 40 (corresponding to the information processing apparatus), and a data transmitter 42 of the personal computer 40 (corresponding to the transmitting means) transmits data to the cellular phone 20. The data transmitted from the data transmitter 42 is received by the data receiver 104 of the mail transmitting server 100, and thereafter the computer virus detector 105 determines whether the data includes a computer virus. When the result of the determination is that a computer virus is detected in the data, the cellular phone 20 is notified of the detection result by the notification method selected by the notification method selector 107. The data is not transmitted at this time. On the other hand, when no computer virus is detected in the data, the data transfer part 106 transfers the data to the mail receiving server 30 and the detection result is not notified of.

According to the information processing system described above, the mail transmitting server 100 selects the notification method for the detection result to the cellular phone 20, based on the type of the computer virus detected in the data transmitted from the personal computer 40 to the cellular phone 20. Such selection of the notification method is particularly effective, for example, in the case where it is difficult to provide the notification of the detection result by e-mail because of the infection with the computer virus that obstructs (including destruction) or amuses the transmission and reception of e-mail, the tightness of traffic, and so on. In such cases, the notification of the virus detection result by the audio response of telephone makes it feasible to securely and quickly notify the user that the computer virus was present in the data transmitted to the user of the cellular phone 20.

Part or all of the components of the mail transmitting server 100 may be spread among a plurality of servers according to their functions. For example, the pattern data database 101 and the computer virus detector 105 may be installed in a virus detecting server physically separate from the mail transmitting server 100. The notification method table 102 may be installed in a user information management server physically separate from the mail transmitting server 100. Furthermore, the detection result notifying part 108 may be installed in an audio response server physically separate from the mail transmitting server 100. The use-restricted service table 103 and the service restricting part 109 may be mounted in a service control server physically separate from the mail transmitting server 100. Furthermore, the communication charge nullifying part 110 may be set in a communication charge management server physically separate from the mail transmitting server 100. When a plurality of servers are arranged in a spread state according to the functions of the respective components of the mail transmitting server 100 as described above, it is feasible to reduce the processing load on the mail transmitting server 100 and to increase degrees of freedom in the physical configuration of the information processing system 1.

Figure 8:
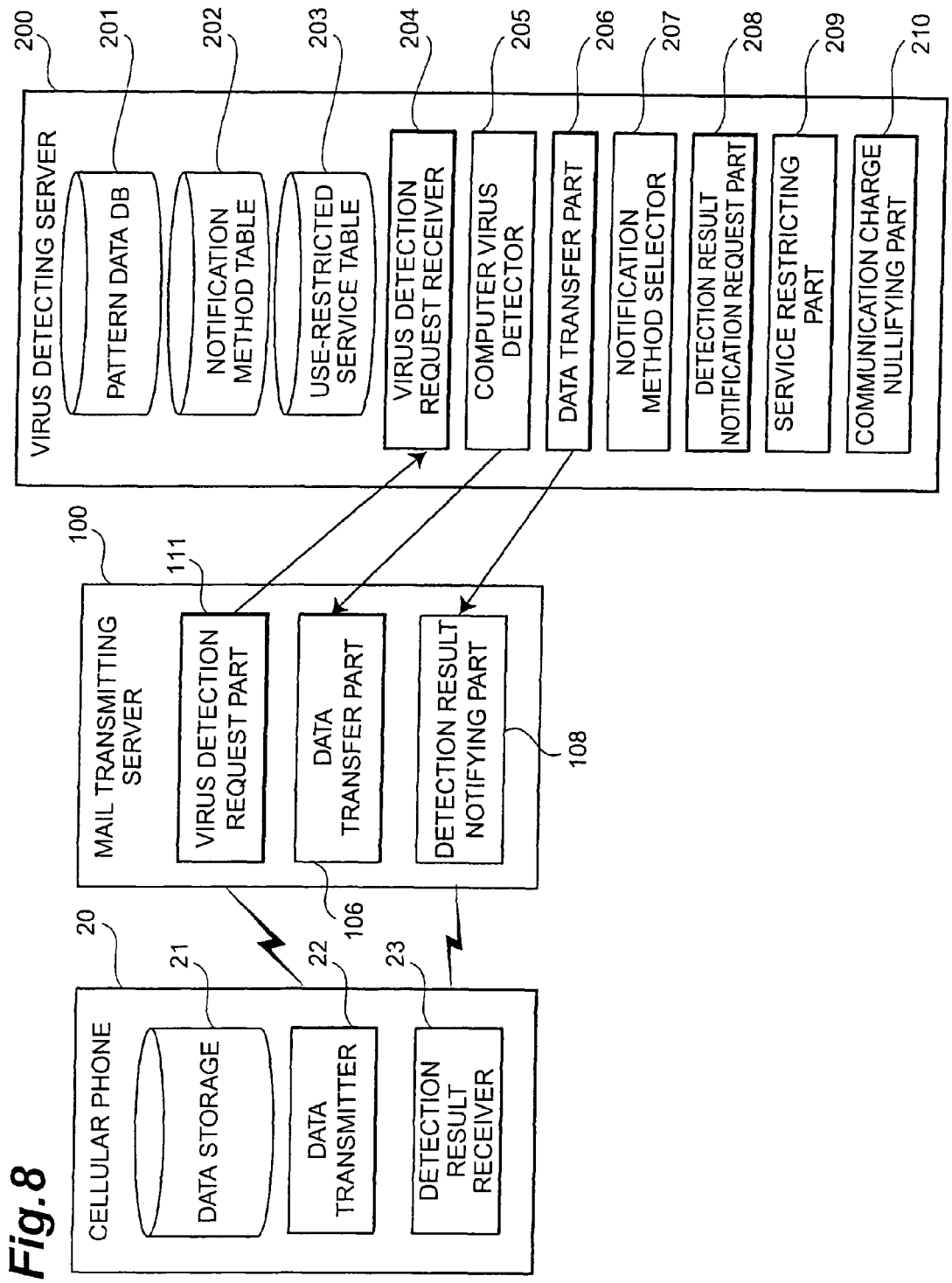
FIG. 8 is a configuration diagram of an information processing system comprised of a cellular phone, a mail transmitting server, and a virus detecting server.

For example, the information processing system shown in FIG. 4 can also be constructed in a configuration as shown in FIG. 8. Namely, the system may be so configured that the mail transmitting server 100 (corresponding to the mail server apparatus) comprises a virus detection request part 111, the data transfer part 106, and the detection result notifying part 108 and that a virus detecting server 200 (corresponding to the server apparatus) constructed separately from the mail transmitting server 100 has the computer virus detecting function. The virus detecting server 200 determines whether the data (from the cellular phone 20 as a data source) transmitted along with the request includes a computer virus, in response to the request from the virus detection request part 111 of the mail transmitting server 100. When the result of the determination is that a computer virus is detected in the data, the virus detecting server 200 requests the mail transmitting server 100 to provide the notification of the detection result by the notification method selected by the notification method selector 207. Receiving the request, the mail transmitting server 100 makes the detection result notifying part 108 notify the cellular phone 20 of the virus detection result. On the other hand, when no computer virus is detected in the data, the virus detecting server 200 requests the mail transmitting server 100 to transfer the data. Receiving the request, the mail transmitting server 100 makes the data transfer part 106 transfer the data to the mail receiving server 30. Thereafter, the data is transmitted to a communication terminal designated as a data destination by the user of the cellular phone 20. Employment of this system configuration makes it feasible to implement the notification of the virus detection result according to the present invention while reducing addition of functions or change of the existing mail transmitting server equipment as much as possible.

Figure 7:
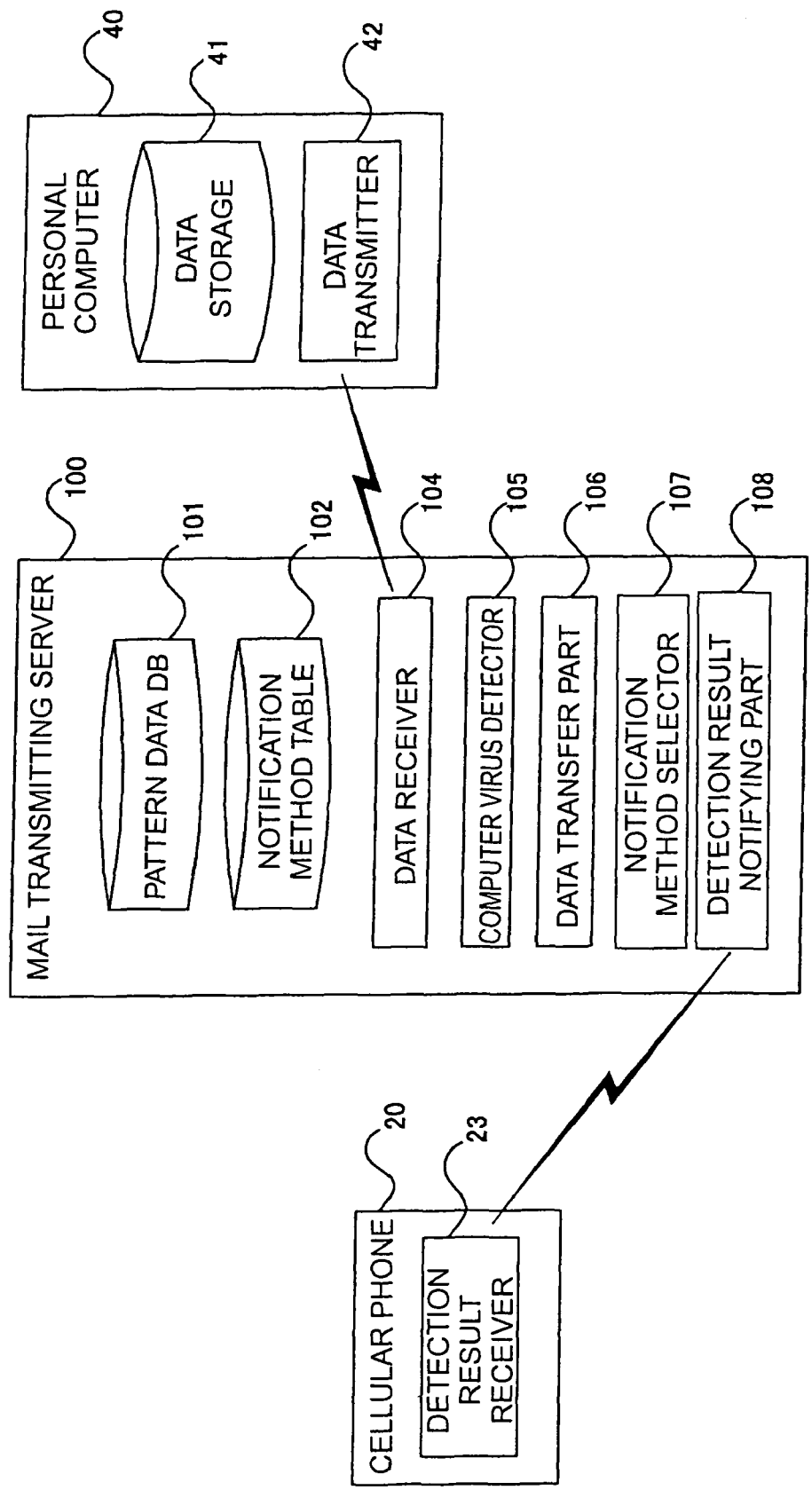
FIG. 7 is a configuration diagram of an information processing system comprised of a mail transmitting server, a cellular phone, and a personal computer.
Figure 9:
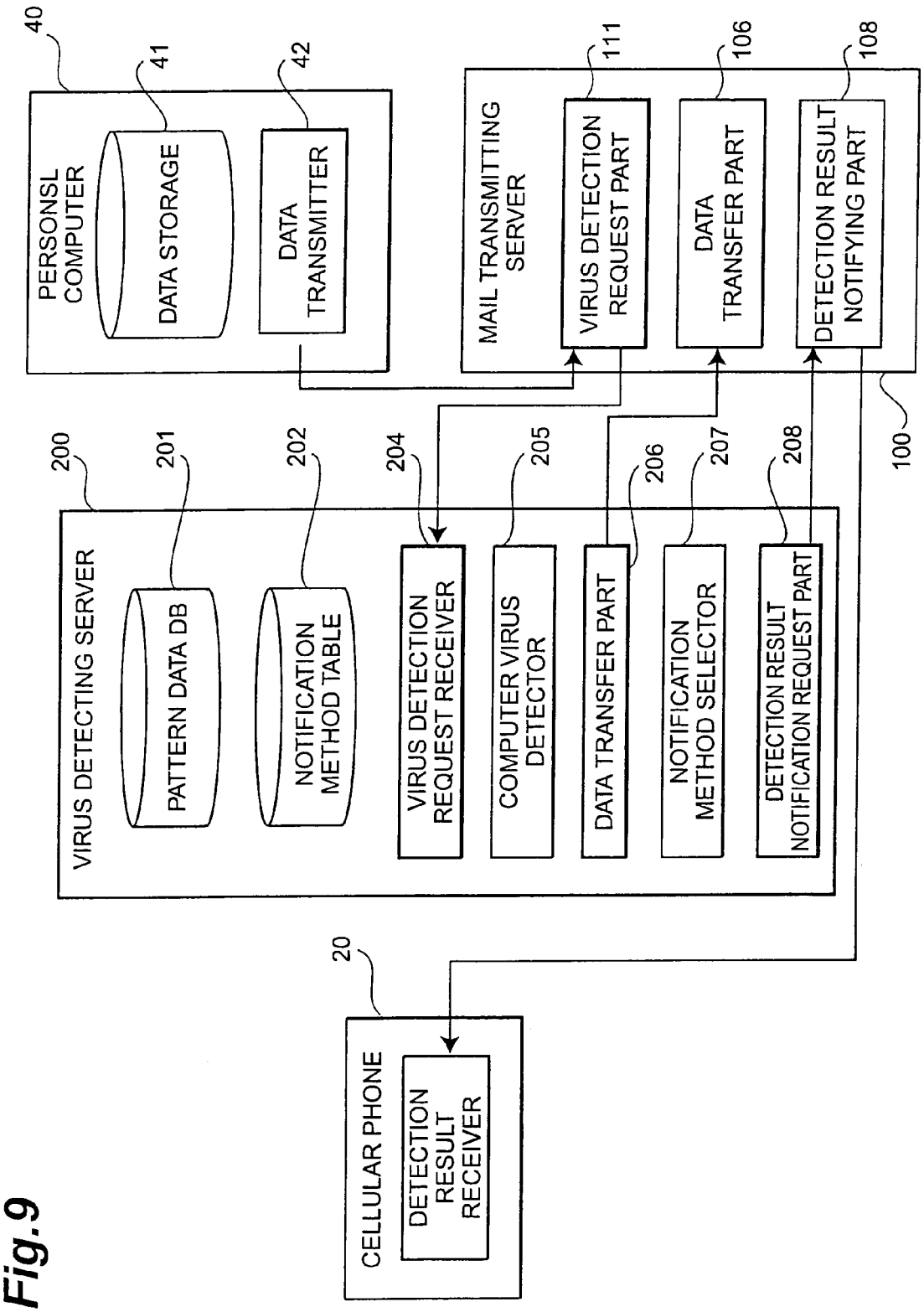
FIG. 9 is a configuration diagram of an information processing system comprised of a cellular phone, a mail transmitting server, a virus detecting server, and a personal computer.

Furthermore, the information processing system shown in FIG. 7 can also be constructed in a configuration as shown in FIG. 9. In this form, the mail transmitting server 100 (corresponding to the mail server apparatus) is also provided with the virus detection request part 111, data transfer part 106, and detection result notifying part 108, and the virus detecting server 200 (corresponding to the server apparatus) constructed separately from the mail transmitting server 100 has the computer virus detecting function. In response to a request from the virus detection request part 111 of the mail transmitting server 100, the virus detecting server 200 determines whether data (from the personal computer 40 as a data source) transmitted along with the request includes a computer virus. When the result of the determination is that a computer virus is detected in the data, the virus detecting server 200 requests the mail transmitting server 100 to provide the notification of the detection result by the notification method selected by the notification method selector 207. Receiving the request, the mail transmitting server 100 makes the detection result notifying part 108 notify the cellular phone 20 of the virus detection result. On the other hand, when no computer virus is detected in the data, the virus detecting server 200 requests the mail transmitting server 100 to transfer the data. Receiving the request, the mail transmitting server 100 makes the data transfer part 106 transfer the data to the mail receiving server 30. Thereafter, the data is transmitted to a communication terminal designated as a data destination by the user of the personal computer 40. Employment of this system configuration makes it feasible to implement the notification of the virus detection result according to the present invention while reducing addition of functions or change of the existing mail transmitting server equipment as much as possible.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A server apparatus comprising:
storage means for storing types of computer viruses and information indicating a notification method of a type of communication for notifying a result of detection of computer viruses in association with each other;
receiving means for receiving data from a communication terminal;
selecting means for selecting one of the notification method of the type of communication for notifying the result of detection of computer viruses to the communication terminal, corresponding to a type of a computer virus included in the data received by the receiving means, on the basis of the types of the computer viruses and the information indicating the notification method of the type of communication stored in the storage means;
notifying means for notifying the communication terminal of the result of detection of the computer viruses, using the notification method of the type of communication selected by the selecting means; and
restricting means for restricting services available to the communication terminal, based on a type of a computer virus included in the data received by the receiving means.

2. The server apparatus according to claim 1, wherein said storage means stores types of services available to the communication terminal and notification methods for the result of detection of computer viruses in association with each other, and
wherein said selecting means selects a notification method for the result of detection of computer viruses to the communication terminal on the basis of the types of the services and the notification methods stored in the storage means.

3. The server apparatus according to claim 1, further comprising charge nullifying means for nullifying a communication charge of data between the communication terminal and the server apparatus if the data received by said receiving means includes a computer virus.

4. The server apparatus according to claim 1, wherein said storage means stores types of computer viruses and either an e-mail or audio response by telephone as the notification method in association with each other,
wherein said selecting means selects the e-mail or audio response by telephone as the notification method, and
wherein said notifying means notifies the communication terminal of the result of detection of the computer viruses, using the e-mail or a voice message.

5. A server apparatus comprising:
storage means for storing types of computer viruses and information indicating a notification method of a type of communication for notifying a result of detection of computer viruses in association with each other;
receiving means for receiving data destined for a communication terminal from an information processing apparatus;
selecting means for selecting one of the notification method of the type of communication for notifying the result of detection of computer viruses to the communication terminal, corresponding to a type of a computer virus included in the data received by the receiving means, on the basis of the types of the computer viruses and the information indicating the notification method of the type of communication stored in the storage means;
notifying means for notifying the communication terminal of the result of detection of the computer viruses, using the notification method of the type of communication selected by the selecting means; and
restricting means for restricting services available to the communication terminal, based on a type of a computer virus included in the data received by the receiving means.

6. The server apparatus according to claim 5, wherein said storage means stores types of computer viruses and either an e-mail or audio response by telephone as the notification method in association with each other,
wherein said selecting means selects the e-mail or audio response by telephone as the notification method, and
wherein said notifying means notifies the communication terminal of the result of detection of the computer viruses, using the e-mail or a voice message.

7. An information processing method of processing data from a communication terminal, received by a server apparatus, the information processing method comprising:
a storing step wherein the server apparatus stores types of computer viruses and information indicating a notification method of a type of communication for notifying a result of detection of computer viruses in association with each other in storage means;
a transmitting step wherein the communication terminal transmits data to the server apparatus;

a receiving step wherein the server apparatus receives the data transmitted from the communication terminal in said transmitting step;

a selecting step wherein the server apparatus selects one of the notification method of the type of communication for notifying the result of detection of computer viruses to the communication terminal, corresponding to a type of a computer virus included in the data received in said receiving step, on the basis of the types of the computer viruses and the information indicating the notification method of the type of communication stored in said storing step;

a notifying step notifying the communication terminal of the result of detection of the computer viruses, using the notification method of the type of communication selected by the selecting step; and a restricting step wherein services available to the communication terminal are restricted based on a type of a computer virus included in the data received in the receiving step.

8. The information processing method according to claim 7, wherein said storing step stores types of computer viruses and either an e-mail or audio response by telephone as the notification method in association with each other in storage means, wherein said selecting step selects the e-mail or audio response by telephone as the notification method, and wherein said notifying step notifies the communication terminal of the result of detection of the computer viruses, using the e-mail or a voice message.

9. An information processing method of processing data from an information processing apparatus, received by a server apparatus, the information processing method comprising:

a storing step wherein the server apparatus stores types of computer viruses and information indicating a notification method of a type of communication for notifying a result of detection of computer viruses in association with each other in storage means;

a transmitting step wherein the information processing apparatus transmits data destined for a communication terminal to the server apparatus;

a receiving step wherein the server apparatus receives the data transmitted from the information processing apparatus in said transmitting step;

a selecting step wherein the server apparatus selects one of the notification method of the type of communication for notifying the result of detection of computer viruses to the communication terminal, corresponding to a type of a computer virus included in the data received in said receiving step, on the basis of the types of the computer viruses and the information indicating the notification method of the type of communication stored in said storing step;

a notifying step notifying the communication terminal of the result of detection of the computer viruses, using the notification method of the type of communication selected by the selecting step; and a restricting step wherein services available to the communication terminal are restricted based on a type of a computer virus included in the data received in the receiving step.

10. The information processing method according to claim 9, wherein said storing step stores types of computer viruses and either an e-mail or audio response by telephone as the notification method in association with each other in storage means, wherein said selecting step selects the e-mail or audio response by telephone as the notification method, and wherein said notifying step notifies the communication terminal of the result of detection of the computer viruses, using the e-mail or a voice message.

11. A server apparatus configured to perform communication with a relay server apparatus for transferring data transmitted from a communication terminal to a predetermined destination, the server apparatus comprising:

storage means for storing types of computer viruses and information indicating a notification method of a type of communication for notifying a result of detection of computer viruses in association with each other;

receiving means for receiving data along with a virus detection request from the relay server apparatus;

detecting means for detecting a computer virus in the data received by the receiving means;

selecting means for selecting one of the notification method of the type of communicating for notifying the result of detection of computer viruses to the communication terminal, corresponding to a type of a computer virus included in the data received by the receiving means, on the basis of the types of the computer viruses and the information indicating the notification method of the type of communication stored in the storage means;

requesting means for requesting the relay server apparatus to provide a notification of the detection result by the notification method of the type of communication selected by said selecting means, when said detecting means detects the computer virus in the data;

notifying means for notifying the communication terminal of the result of detection of the computer viruses, using the notification method of the type of communicating selected by the selecting means; and restricting means for restricting services available to the communication terminal based on a type of a computer virus included in the data received by the receiving means.

12. A server apparatus configured to perform communication with a relay server apparatus for transferring data transmitted from an information processing apparatus to a predetermined destination, the server apparatus comprising:

storage means for storing types of computer viruses and information indicating a notification method of a type of communication for notifying a result of detection of computer viruses in association with each other;

receiving means for receiving data along with a virus detection request from the relay server apparatus;

detecting means for detecting a computer virus in the data received by the receiving means;

selecting means for selecting one of the notification method of the type of communicating for notifying the result of detection of computer viruses to a communication terminal, corresponding to a type of a computer virus included in the data received by the receiving means, on the basis of the types of the computer viruses and the information indicating the notification method of the type of communication stored in the storage means;

requesting means for requesting the relay server apparatus to provide a notification of the detection result by the notification method of the type of communication selected by said selecting means, when said detecting means detects the computer virus in the data;

notifying means for notifying the communication terminal of the result of detection of the computer viruses, using the notification method of the type of communicating selected by the selecting means; and restricting means for restricting services available to the communication terminal based on a type of a computer virus included in the data received by the receiving means.

13. An information processing method in which a server apparatus performs communication with a relay server apparatus for transferring data transmitted from a communication terminal to a predetermined destination, the information processing method comprising:

a storing step of storing types of computer viruses and information indicating a notification method of a type of communication for notifying a result of detection of computer viruses in association with each other in storage means;

a receiving step of receiving data along with a virus detection request from the relay server apparatus;

a detecting step of detecting a computer virus in the data received in the receiving step;

a selecting step of selecting one of the notification method of the type of communicating for notifying the result of detection of computer viruses to the communication terminal, corresponding to a type of a computer virus included in the data received in the receiving step, on the basis of the types of the computer viruses and the information indicating the notification method of the type of communication stored in the storage means;

a requesting step of requesting the relay server apparatus to provide a notification of the result of detection by the notification method of the type of communication selected in the selecting step, when a computer virus is detected in the data in the detecting step;

a notifying step notifying the communication terminal of the detection result of the computer viruses, using the notification method of the type of communicating selected by the selecting step; and a restricting step wherein services available to the communication terminal are restricted based on a type of a computer virus included in the data received in the receiving step.

14. An information processing method in which a server apparatus performs communication with a relay server apparatus for transferring data transmitted from an information processing apparatus to a predetermined destination, the information processing method comprising:

a storage step of storing types of computer viruses and information indicating a notification method of a type of communication for notifying a result of detection of computer viruses in association with each other in storage means;

a receiving step of receiving data along with a virus detection request from the relay server apparatus;

a detecting step of detecting a computer virus in the data received in the receiving step;

a selecting step of selecting one of the notification method of the type of communicating for notifying the result of detection of computer viruses to a communication terminal, corresponding to a type of a computer virus included in the data received in the receiving step, on the basis of the types of the computer viruses and the information indicating the notification method of the type of communication stored in the storage means;

a requesting step of requesting the relay server apparatus to provide a notification of the detection result by the notification method of the type of communication selected in the selecting step, when a computer virus is detected in the data in the detecting step;

a notifying step notifying the communication terminal of the result of detection of the computer viruses, using the notification method of the type of communicating selected by the selecting step; and a restricting step wherein services available to the communication terminal are restricted based on a type of a computer virus included in the data received in the receiving step.

15. A server apparatus configured to perform communication with a mail server apparatus for transferring data transmitted from a communication terminal to a predetermined destination, the server apparatus comprising:

storage means for storing types of computer viruses and information indicating a notification method of a type of communication for notifying a result of detection of computer viruses in association with each other;

receiving means for receiving data along with a virus detection request from the mail server apparatus;

detecting means for detecting a computer virus in the data received by the receiving means;

selecting means for selecting one of the notification method of the type of communicating for notifying the result of detection of computer viruses to the communication terminal, corresponding to a type of a computer virus included in the data received by the receiving means, on the basis of the types of the computer viruses and the information indicating the notification method of the type of communication stored in the storage means;

notifying means for notifying the communication terminal of the result of detection by the notification method of the type of communicating selected by said selecting means, when said detecting means detects the computer virus in the data and restricting means for restricting services available to the communication terminal based on a type of a computer virus included in the data received by the receiving means.

16. A server apparatus configured to perform communication with a mail server apparatus for transferring data transmitted from an information processing apparatus to a predetermined destination, the server apparatus comprising:

storage means for storing types of computer viruses and information indicating a notification method of a type of communication for notifying a result of detection of computer viruses in association with each other;

receiving means for receiving data along with a virus detection request from the mail server apparatus;

detecting means for detecting a computer virus in the data received by the receiving means;

selecting means for selecting one of the notification method of the type of communicating for notifying the result of detection of computer viruses to a communication terminal, corresponding to a type of a computer virus included in the data received by the receiving means, on the basis of the types of the computer viruses and the information indicating the notification method of the type of communication stored in the storage means;

notifying means for notifying the communication terminal of the result of detection by the notification method of the type of communicating selected by said selecting means, when said detecting means detects the computer virus in the data; and restricting means for restricting services available to the communication terminal based on a type of a computer virus included by the data received in the receiving means.

17. An information processing method in which a server apparatus performs communication with a mail server apparatus for transferring data transmitted from a communication terminal to a predetermined destination, the information processing method comprising:

a storing step of storing types of computer viruses and information indicating a notification method of a type of communication for notifying a result of detection of computer viruses in association with each other in storage means;

a receiving step of receiving data along with a virus detection request from the mail server apparatus;

a detecting step of detecting a computer virus in the data received in the receiving step;

a selecting step of selecting one of the notification method of the type of communicating for notifying the result of detection of computer viruses to the communication terminal, corresponding to a type of a computer virus included in the data received in the receiving step, on the basis of the types of the computer viruses and the information indicating the notification method of the type of communication stored in the storage means;

a notifying step of notifying the communication terminal of the result of detection by the notification method of the type of communicating selected in the selecting step, when a computer virus is detected in the data in the detecting step; and a restricting step wherein services available to the communication terminal are restricted based on a type of a computer virus included in the data received in the receiving step.

18. An information processing method in which a server apparatus performs communication with a mail server apparatus for transferring data transmitted from an information processing apparatus to a predetermined destination, the information processing method comprising:

a storage step of storing types of computer viruses and information indicating a notification method of a type of communication for notifying a result of detection of computer viruses in association with each other in storage means;

a receiving step of receiving data along with a virus detection request from the mail server apparatus;

a detecting step of detecting a computer virus in the data received in the receiving step;

a selecting step of selecting a one of the notification method of the type of communicating for notifying the result of detection of computer viruses to a communication terminal, corresponding to a type of a computer virus included in the data received in the receiving step, on the basis of the types of the computer viruses and the information indicating the notification method of the type of communication stored in the storage means;

a notifying step of notifying the result of detection by the communication terminal of the notification method of the type of communicating selected in the selecting step, when a computer virus is detected in the data in the detecting step; and a restricting step wherein services available to the communication terminal are restricted based on a type of a computer virus included in the data received in the receiving step.

* * * * *